United States Patent
Fink et al.

(10) Patent No.: US 12,472,579 B2
(45) Date of Patent: Nov. 18, 2025

(54) SONOTRODE BEARING FOR AN ULTRASONIC WELDING DEVICE

(71) Applicant: NovaTec GmbH Innovative Technologie, Hattersheim (DE)

(72) Inventors: Daniel Fink, Rüsselsheim (DE); Markus Bingel, Nidderau (DE); Boris Skledar, Niedernhausen (DE)

(73) Assignee: NovaTec GmbH Innovative Technologie, Hattersheim (DE)

( * ) Notice: Subject to any disclaimer, the term of this patent is extended or adjusted under 35 U.S.C. 154(b) by 0 days.

(21) Appl. No.: 18/698,552

(22) PCT Filed: Oct. 6, 2022

(86) PCT No.: PCT/EP2022/077784
§ 371 (c)(1),
(2) Date: Apr. 4, 2024

(87) PCT Pub. No.: WO2023/057552
PCT Pub. Date: Apr. 13, 2023

(65) Prior Publication Data
US 2025/0001517 A1   Jan. 2, 2025

(30) Foreign Application Priority Data
Oct. 8, 2021   (EP) .................................. 21201667

(51) Int. Cl.
*B23K 20/00* (2006.01)
*B23K 20/10* (2006.01)

(52) U.S. Cl.
CPC .................. *B23K 20/106* (2013.01)

(58) Field of Classification Search
CPC .................. H01L 2224/85205; B23K 20/106
See application file for complete search history.

(56) References Cited

U.S. PATENT DOCUMENTS 3,054,309 A * 9/1962 Elmore ............... B23K 20/106
228/1.1
5,364,005 A * 11/1994 Whelan ............... B23K 20/106
228/1.1
(Continued)

FOREIGN PATENT DOCUMENTS

DE   212017000184 U1   2/2019
WO   2021089153 A1   5/2021

*Primary Examiner* — Erin B Saad
(74) *Attorney, Agent, or Firm* — Young Basile Hanlon & MacFarlane, P.C.

(57) ABSTRACT

This invention relates to a sonotrode bearing for an ultrasonic welding device. The bearing comprises: a frame, wherein the frame at least partially delimits an opening for receiving the sonotrode; wherein the frame is designed in the region of the opening to support the sonotrode in the opening; wherein the frame is designed in such a way that, by the action of a force from the sonotrode on a first section of the frame, the frame deforms in such a way that a second section of the frame is thereby moved into the opening, wherein the second section is different from the first section. The invention also relates to a kit, a sonotrode, an ultrasonic welding device, a method for retrofitting an ultrasonic welding device and a use of the bearing or of the kit for supporting a sonotrode of an ultrasonic welding device.

10 Claims, 7 Drawing Sheets

(56) References Cited

U.S. PATENT DOCUMENTS

| | | | | |
|---|---|---|---|---|
| 6,073,827 | A * | 6/2000 | Razon | H01L 24/78 |
| | | | | 228/180.5 |
| 6,575,348 | B2 * | 6/2003 | Kimura | B23K 20/004 |
| | | | | 228/110.1 |
| 7,137,543 | B2 * | 11/2006 | DeAngelis | B06B 3/00 |
| | | | | 228/110.1 |
| 7,303,110 | B2 * | 12/2007 | Zhai | B06B 3/00 |
| | | | | 228/1.1 |
| 8,052,026 | B2 * | 11/2011 | Kakutani | H01L 24/78 |
| | | | | 228/110.1 |
| 8,152,043 | B2 * | 4/2012 | Kakutani | H01L 24/78 |
| | | | | 228/110.1 |
| 8,434,656 | B2 * | 5/2013 | Kakutani | H01L 24/85 |
| | | | | 228/110.1 |
| 8,511,534 | B2 * | 8/2013 | Kakutani | H01L 24/85 |
| | | | | 228/110.1 |
| 2003/0000994 | A1 * | 1/2003 | Kyomasu | B23K 1/06 |
| | | | | 228/1.1 |
| 2003/0047583 | A1 * | 3/2003 | Kyomasu | B06B 3/00 |
| | | | | 228/110.1 |
| 2006/0196915 | A1 * | 9/2006 | Gunnerman | B06B 3/00 |
| | | | | 228/110.1 |
| 2011/0220292 | A1 * | 9/2011 | Short | B32B 37/00 |
| | | | | 156/580.1 |
| 2016/0023297 | A1 * | 1/2016 | Stroh | B06B 3/00 |
| | | | | 228/1.1 |
| 2021/0139067 | A1 * | 5/2021 | Schacht | F16H 57/039 |

* cited by examiner

Possible variants for projections 5a, 5b

SONOTRODE BEARING FOR AN ULTRASONIC WELDING DEVICE

CROSS REFERENCE TO RELATED APPLICATION(S)

This application claims priority to International Patent Application No. PCT/EP2022/077784, filed Oct. 6, 2022, and European Patent Application Serial No. 21201667.9, filed Oct. 8, 2021, the entire disclosures both of which are hereby incorporated by reference.

TECHNICAL FIELD

The invention described here relates to a bearing for a sonotrode of an ultrasonic welding device, a kit for an ultrasonic welding device, a sonotrode for use with the bearing or the kit, an ultrasonic welding device, a method for retrofitting a sonotrode of an ultrasonic welding device, and a use of the bearing or of the kit for supporting a sonotrode of an ultrasonic welding device.

BACKGROUND

Known ultrasonic welding devices, often embodied as welding tongs, have a sonotrode arranged exchangeably in a holder. This sonotrode is usually fixed to the holder by means of a screw connection, which generates a pretensioning force. This fixing is intended to prevent movements of the sonotrode in vertical direction or horizontal direction as well as rotations of the sonotrode about the longitudinal axis of the sonotrode from occurring during operation of the ultrasonic welding device under load, in particular due to the longitudinal oscillations of the sonotrode in the direction of the main oscillation direction of the sonotrode, and adversely affecting the welding process. An occurrence of such movements or rotations of the sonotrode could otherwise lead to the desired ultrasonic welding process, which takes place between sonotrode and anvil, not being able to be reliably carried out.

FIG. 9 shows such an arrangement 1000 according to the state of the art, in which a screw 1002 presses a sonotrode 1001 against countermasses 1003, in order thus to prevent the undesired movements and rotations.

The general desire for more energy-efficient electrical devices, such as for example refrigerators, has led to more insulating material being installed in such devices, as a result of which less space remains in such devices for the ultrasonic welding, for example of metal tubes. This requires smaller, hand-guided ultrasonic welding devices, in particular with a more compact and lighter arrangement of the sonotrode.

In practice, it has now been found that, in the case of a miniaturization of the ultrasonic welding devices and correspondingly small-dimensioned screw connection for the sonotrode, it is not possible to generate a sufficient pretensioning force between the sonotrode and its holder, in order to ensure a reliable holding of the sonotrode and the suppression of the undesired movements and rotations of the sonotrode. Furthermore, the use of screws and their countermasses leads to the miniaturization and reduction of the weight of the ultrasonic welding device being subject to limits which, however, have to be overcome for diverse applications on particularly small space. Furthermore, the use of screws for fastening the sonotrode leads to lost channels for the vibrations being formed via couplings between sonotrode and screws, on the one hand, and sonotrode and countermasses, on the other hand, and undesired heat being generated on account of these couplings.

BRIEF DESCRIPTION OF THE INVENTION

The present invention therefore relates to the object of finding means which allow reliable ultrasonic welding also in smaller spaces.

This object can be achieved, for example, by a bearing for a sonotrode of an ultrasonic welding device, by a kit, by a sonotrode, by an ultrasonic welding device, and/or by a method or a use associated with any of these.

A bearing according to the invention for a sonotrode of an ultrasonic welding device comprises: a frame, wherein the frame at least partially delimits an opening for receiving the sonotrode; wherein the frame is designed in the region of the opening to support the sonotrode in the opening; wherein the frame is designed in such a way that, by the action of a force from the sonotrode on a first section of the frame, the frame deforms in such a way that a second section of the frame is thereby moved into the opening, wherein the second section is different from the first section.

According to a particularly preferred realization, a bearing according to the invention for a sonotrode of an ultrasonic welding device comprises the following:

a frame, wherein the frame at least partially delimits an opening for receiving the sonotrode, wherein the frame is designed in the region of the opening to support the sonotrode in the opening, wherein the frame has a first section and a second section, wherein the first section of the frame comprises a crossbar of the frame and the second section of the frame comprises at least one leg of the frame, wherein the at least one leg is attached to an end of the transverse beam, wherein the frame is designed in such a way that, by the action of a force from the sonotrode on the crossbar, the frame deforms in such a way that the at least one leg is thereby moved into the opening in order to exert a clamping force on the sonotrode, wherein the transverse beam has towards the opening one, two or more projections for supporting the sonotrode in the opening, wherein the force acting from the sonotrode on the transverse beam acts on the one, two or more projections, and wherein each projection of at least a part of the one, two or more projections is shaped such that the projection is designed to support the sonotrode by means of at least one line contact with the sonotrode.

The sonotrode according to the invention is adapted for use with, in particular for support in, the bearing or kit according to the invention. The sonotrode comprises one or more recesses for receiving the one, two or more projections of the first and/or second section and/or a recess for receiving a limiting means for limiting the movement of the sonotrode along its longitudinal axis.

By virtue of the fact that, instead of a fastening of the sonotrode by means of screws and countermasses, a bearing with a frame for receiving and supporting the sonotrode is used, the abovementioned disadvantages of a screw connection, in particular the lost channels and limitations of the miniaturization and the weight reduction, can be overcome.

By virtue of the fact that the frame is designed in such a way that, by the action of a force from the sonotrode on a first section of the frame, the frame deforms in such a way that a second section, different from the first section, of the frame is thereby moved into the opening, and the sonotrode is thereby fixed or clamped, it is additionally made possible for reliable fixing of the sonotrode to be made possible even in the case of miniaturization and reduction of the weight of the ultrasonic welding device. This reliable fixing of the sonotrode is achieved in particular by virtue of the fact that, precisely in the case of load during the ultrasonic welding process and the force which occurs as a result and which acts from the sonotrode on the first section of the frame, the frame takes this load into account in the fixing of the sonotrode by the second section of the frame moving into the opening and thus reducing the size of the opening and fixing or clamping the sonotrode. During this movement of the second section into the opening, the second section can move towards the first section.

In other words, the sonotrode bearing according to the invention makes possible a self-regulating fastening mechanism in which, precisely when (greater) fixing of the sonotrode is required, namely in the case of a load in the ultrasonic welding process, the frame of the sonotrode bearing contracts by movement of the second section into the opening and fixes or clamps the sonotrode (to a greater extent).

In this case, on account of an internal lever mechanism, the frame can react to it to a greater extent the greater the load, by virtue of a force, which is greater in the case of the greater load and acts from the sonotrode on the first section, the second section of the frame being moved further into the opening by greater deformation of the frame and thus fixing or clamping the sonotrode to a greater extent. As a result of the second section moving further into the opening, the opening is reduced to a greater extent. This greater reaction of the frame of the sonotrode bearing arises by virtue of the fact that, in the case of a greater force acting from the sonotrode on the first section of the frame during the ultrasonic welding process, the frame deforms to a greater extent and, on account of the lever mechanism in the frame, the second section is thereby moved to a greater extent into the opening.

The sonotrode bearing according to the invention additionally allows greater miniaturization of the ultrasonic welding device and greater weight reduction of such devices down to below 8 kg, even down to below 6 kg or 5 kg. With the conventional screw-based systems from the prior art, weights below 8 kg have usually not been achieved.

Furthermore, as a result of the sonotrode bearing according to the invention, the setting of the cutting gap between sonotrode and anvil in the horizontal direction can be dispensed with, which could be complex precisely in the case of the screw-based systems from the prior art.

Furthermore, as a result of the sonotrode bearing according to the invention, the replacement of a worn sonotrode is possible more simply, and can be achieved in particular with a short changeover time, in comparison with the screw-based systems from the prior art. Furthermore, a sonotrode from the prior art fastened by means of screws can also be retrofitted simply by the bearing according to the invention or the kit according to the invention.

The above-described fixing of the sonotrode by the movement of the second section into the opening allows the limitation or prevention of the movement of the sonotrode in vertical and/or horizontal direction, as well as the limitation or prevention of a rotation of the sonotrode about its longitudinal axis in clockwise direction and/or counter-clockwise direction.

A particularly effective limitation of such a movement of the sonotrode in vertical and/or horizontal direction as well as a particularly effective limitation of such a rotation of the sonotrode results from preferred embodiments of the sonotrode bearing according to which the first section of the frame has one, two or more projections toward the opening for mounting the sonotrode in the opening. The second section of the frame can also have one, two or more projections for supporting the sonotrode in the opening. These projections can have point or line contacts at the interface of the projections with the sonotrode for supporting the sonotrode, as a result of which a further advantage of these projections is furthermore achieved, namely a reduction of the losses by less coupling between sonotrode and frame. Point or line contacts lead to fewer couplings and thereby to fewer lost channels in comparison with the areal contacts between fastening and sonotrode known from the prior art. As a result, less heat loss is also generated.

One or more or each of the projections of the first and/or second section can have a bearing surface for supporting the sonotrode in the opening, wherein preferably the point or line contact with the sonotrode is at the interface between the bearing surface and the surface of the sonotrode. The bearing surface of each or some of the projections can have the shape of a section of a spherical surface or the shape of a section of a cuboid surface, which is particularly advantageous with regard to minimizing the couplings with the sonotrode. If the bearing surface has the shape of a section of a spherical surface, this allows a particularly advantageous absorption of forces to exist, particularly few deformations to occur at the bearing surface and/or counter surface and a particularly advantageous flexibility to exist in the relative arrangement of the counter surface with respect to the bearing surface.

The one, two or more projections in the region of the second section for supporting the sonotrode in the opening can, in the case of deformation of the frame on account of the force of the sonotrode on the first section, simplify the movement of the second section into the opening and allow the second section to be moved further into the opening and thus an even greater fixing or clamping action with respect to the sonotrode to arise. Furthermore, lost channels can also be avoided by these projections in the region of the second section with point or line contacts with the sonotrode.

According to preferred embodiments, the frame of the bearing according to the invention can comprise a crossbar in the first section and one or two legs in the second section. Each of the legs is attached at one end of the leg to a (different) end of the crossbar and the other end of the leg can be a free end. An embodiment of the frame with crossbar and legs allows in a particularly effective manner the deformation of the frame in the case of an acting force from the sonotrode on the first section and the movement of the second section into the opening by a pivoting of the legs with respect to the crossbar into the opening. As a result of the movement of the second section, for example by the pivoting of the leg, into the opening, the opening is reduced in size and the sonotrode is fixed or clamped. The use of the legs and of the crossbar in this case allows a movement of the second section further into the opening and thus a greater fixing of the sonotrode under load.

One end of each leg can preferably be attached to a different end of the crossbar. The frame can preferably be open in a region opposite the first section and in the region of the first and the second section in each case be closed. In the state mounted on the ultrasonic welding device, the frame can preferably have the shape of an inverted U, wherein the crossbar is arranged horizontally at the closed end of the U and each of the legs of the frame is arranged in each case at a different one of the vertical regions of the U. In the rest state of the frame, the first section of the frame can extend perpendicular to the second section of the frame and/or each of the legs can extend perpendicular to the crossbar. In the activated state of the frame, that is to say when a force from the sonotrode acts on the first section of the frame and the frame deforms, as a result of the movement of the second section into the opening, the angle between the first section and the second section, in particular between one or each of the legs and the crossbar, is reduced to an angle of less than 90° and greater than 0°, preferably to an angle in the range 89°-87°, or to an angle of 88°. One or each of the legs II is therefore pivoted by 1-3°, preferably by 2°, into the opening 4 and in the direction of the crossbar I. In particular as a result, the sonotrode is fixed to the sonotrode particularly effectively even in the case of a load and without the use of screws. By way of example, the frame of the sonotrode bearing can be composed of a steel.

According to preferred embodiments, the frame further has a support surface for attaching the bearing to a housing of the ultrasonic welding device, wherein the support surface has an inclined plane designed to slide along an inclined plane of the housing by the action of the force from the sonotrode on the first section of the frame in the direction of the longitudinal axis of the sonotrode away from the head of the sonotrode. This support surface, too, in turn allows an additional self-regulating mechanism, according to which, precisely in the case of a greater force acting on the first section by the sonotrode during the ultrasonic welding process, the support surface can slide back to a greater extent along the inclined plane of the housing on account of the inclined plane and thus dropping of the frame from the ultrasonic welding device, precisely in the case of a greater load, is prevented. The greater the load and thus the force, the greater the extent to which the frame is pulled away from the region in which the welding process takes place or from the head of the sonotrode on account of the inclined plane of the support surface on the housing. Thus, the bearing can be fastened to the ultrasonic welding device without fastening means, such as for example screws, as a result of which lost channels are also prevented at this point and a further miniaturization and weight reduction of the ultrasonic welding device is made possible, but without endangering the stability of the fixing of the sonotrode and thus the reliability of the welding process.

If this brief description of the invention describes features which are not listed in the claims, these features do not constitute essential features in the sense that these features are necessarily to be included in the claims for the description of the invention, but these features are particularly prominent preferred realizations of the claimed invention, can be combined with each of the claims and can also be combined with one another as desired.

Components which are illustrated in a plurality of figures bear the same reference signs.

DETAILED DESCRIPTION

Figure 4:
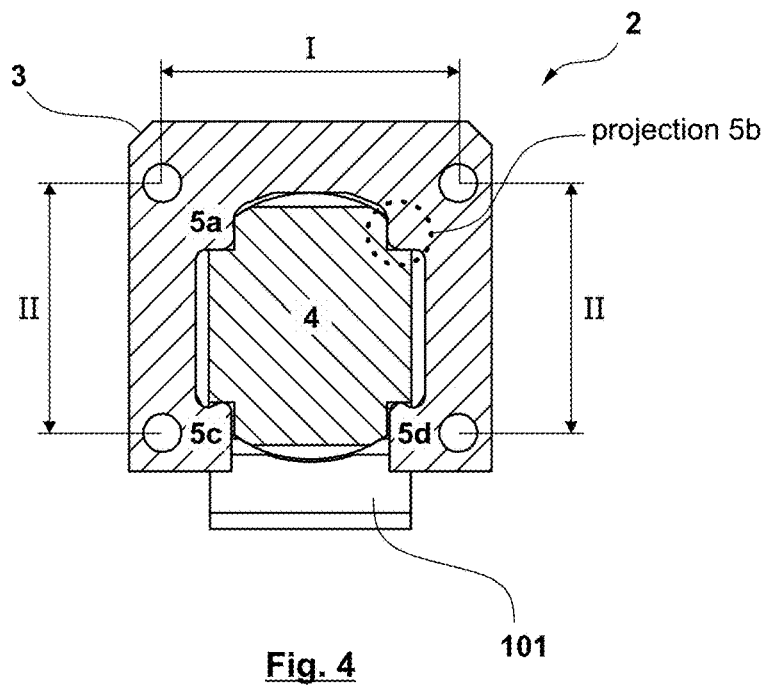
FIG. 4 shows a section through the bearing according to the invention according to section A-A in FIG. 3.

According to the invention, it is proposed to provide a bearing 2 for a sonotrode 101 of an ultrasonic welding device 100, as shown by way of example in FIG. 4.

Figure 1:
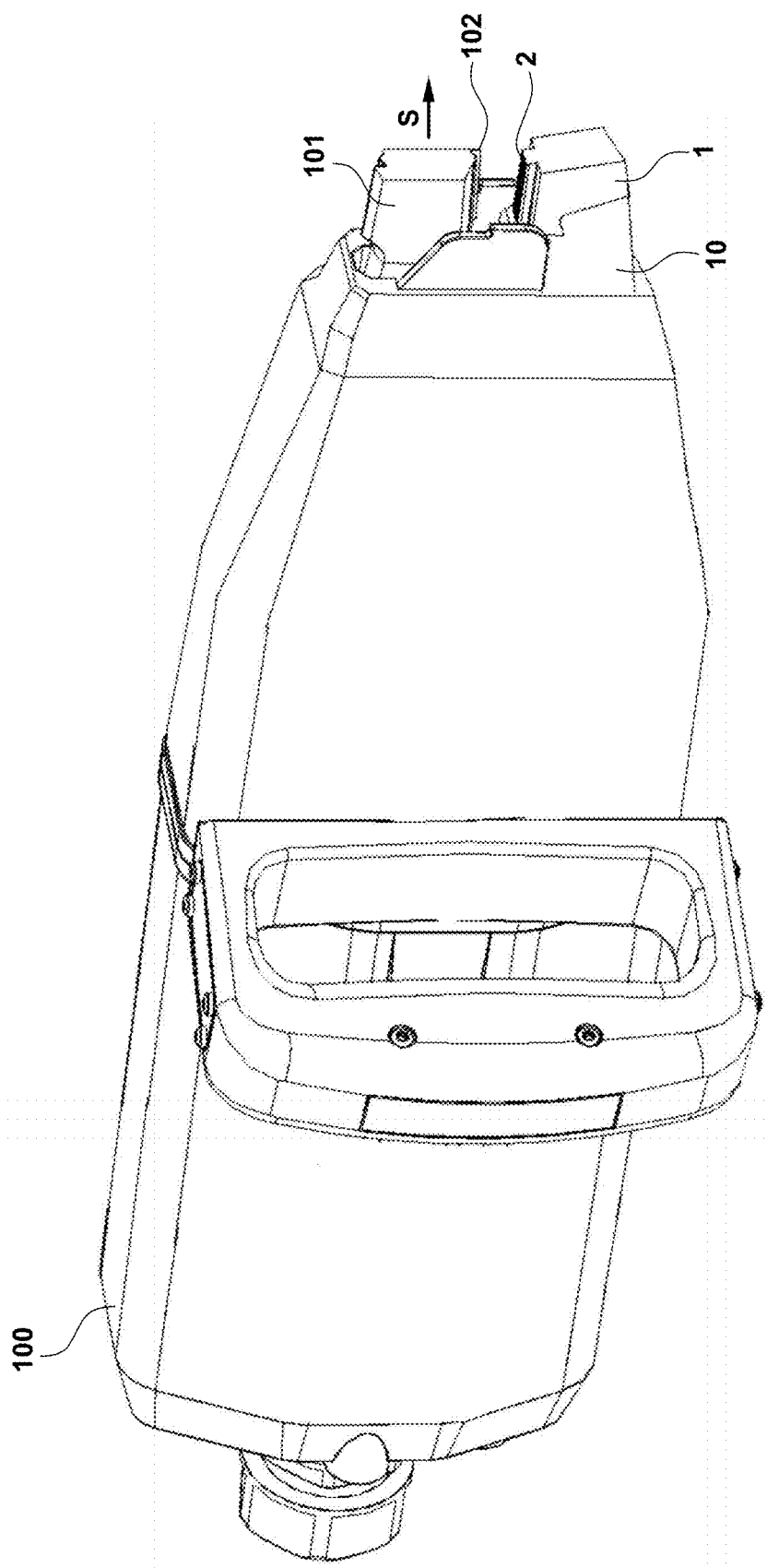
FIG. 1 shows an ultrasonic welding device according to the invention comprising an anvil, an anvil carrier and a sonotrode. The figure also indicates the main oscillation direction of the sonotrode.

Firstly, however, we turn to FIG. 1. This shows an ultrasonic welding device 100 according to the invention comprising an anvil 1 and an anvil carrier 10, and a sonotrode 101 according to the invention. The figure also indicates the main oscillation direction S along the longitudinal axis of the sonotrode and the counter surface 102 of the sonotrode 101 interacting with the working surface 2 of the anvil 1. The longitudinal axis of the sonotrode forms the main oscillation axis of the sonotrode. The welding space in which the object to be welded is introduced and the welding process takes place is situated between the working surface 2 and the counter surface 102.

The working surface 2 can be a surface of the anvil 1 oriented toward the sonotrode 101, in particular toward the counter surface 102, of the ultrasonic welding device 100 during the ultrasonic welding by the ultrasonic welding device 100.

The ultrasonic welding device has a handle with which the latter can be controlled by the user to the space in that the object to be welded, for example metal tubes, is to be welded by means of ultrasonic welding. The object to be welded is placed between the working surface 2 and the counter surface 102 and the anvil 1 is guided against the sonotrode 101 and pressed against it while the object is welded by means of longitudinal oscillation of the sonotrode 101 in the main oscillation direction S of the sonotrode. Tubes can be welded in a fluid-tight manner by means of such ultrasonic welding.

Figure 2:
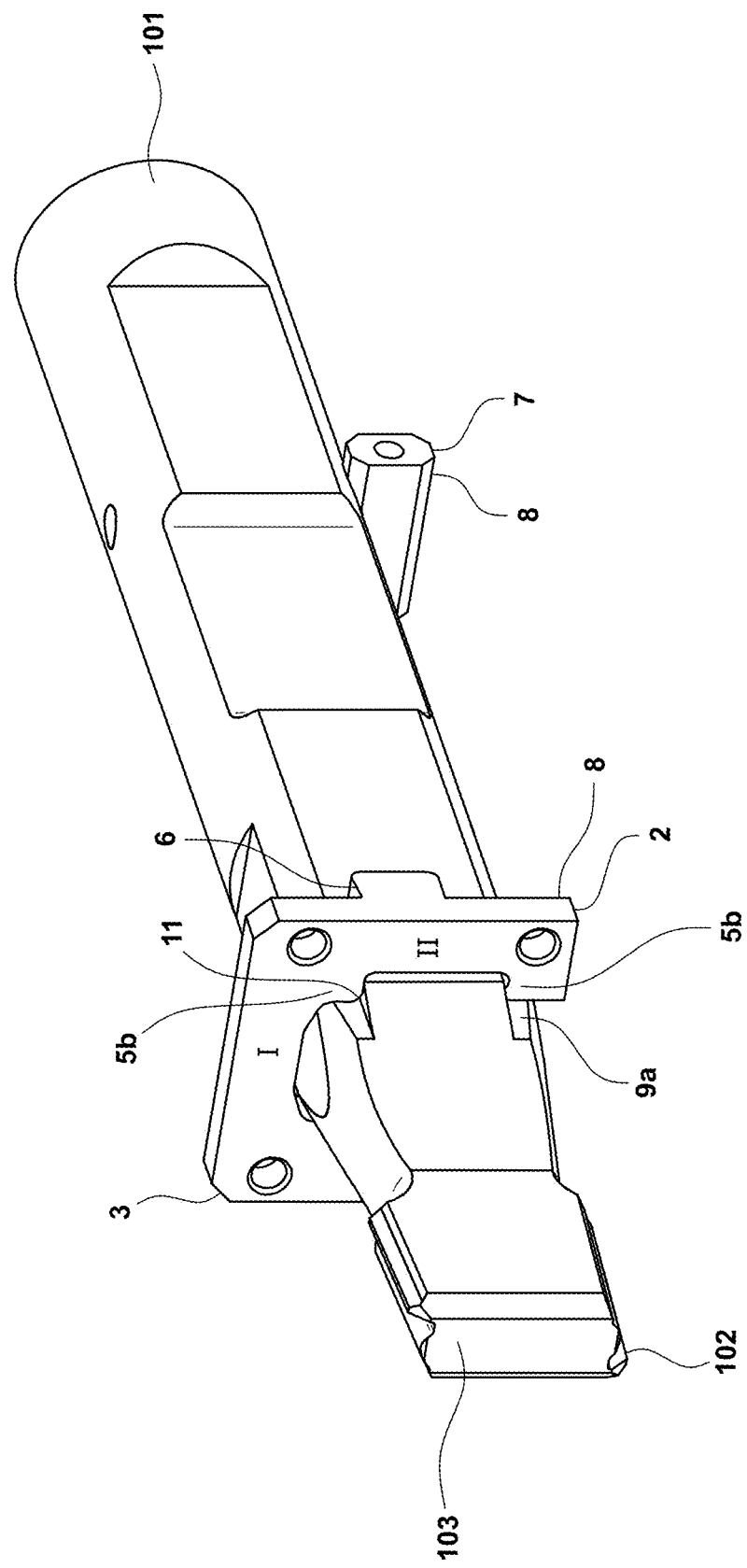
FIG. 2 shows a three-dimensional representation of the kit according to the invention together with bearings according to the invention and a sonotrode according to the invention for use with the kit.
Figure 3:
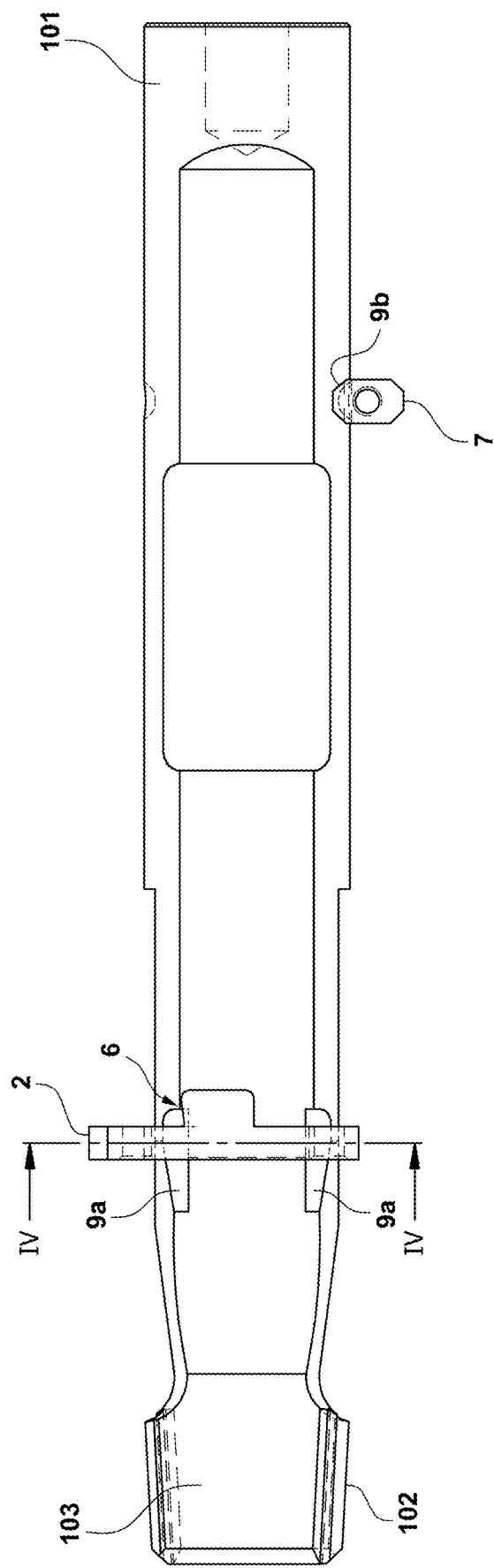
FIG. 3 shows a side view of the arrangement according to FIG. 2.

FIG. 2 shows a three-dimensional representation of the kit 8 according to the invention together with bearing 2 according to the invention and limiting means 7, and a sonotrode 101 according to the invention for use with the kit 8. FIG. 3 shows a side view of the arrangement according to FIG. 2. FIG. 4 shows a section through the bearing 2 according to the invention according to section A-A in FIG. 3.

The limiting means 7, for example a pin, serves for limiting each movement of the sonotrode 101 in the direction of the longitudinal axis of the sonotrode 101, that is to say in the direction of the welding region or anvil or away from it. However, the limiting means is optional here and the sonotrode 101 can also be used only with the bearing 2 according to the invention. As shown in FIG. 2, the sonotrode 101 can have one or more recesses 9 *a*, for example notches, into which the projections 5 *b*, 5 *d* of the frame 3 of the bearing 2 for supporting the sonotrode 101 can engage. The shape of the recesses 9 *a* is preferably complementary to the shape of the projections 5*b*, 5*d*.

Furthermore, when using the optional limiting means 7, the sonotrode 101 can have a recess to 9 *b*, for example a notch, which extends perpendicular or substantially to the longitudinal axis of the sonotrode and is designed to receive the limiting means 7 in such a way that the sonotrode 101 can no longer be moved or substantially no longer moved along its longitudinal axis. Longitudinal oscillation of the sonotrode 101 is also possible when using the limiting means 7.

The abovementioned sonotrode bearing 2 according to the invention, as shown for example in FIG. 4, comprises a frame here, wherein the frame 3 at least partially delimits an opening 4 for receiving the sonotrode 101; wherein the frame 3 is designed in the region of the opening 4 to support the sonotrode 101 in the opening 4; and wherein the frame 3 is designed in such a way that, by the action of a force F (see FIG. 7) from the sonotrode 101 on a first section I of the frame 3, the frame 3 deforms in such a way that a second section II of the frame 3 is thereby moved into the opening 4, wherein the second section II is different from the first section I. This movement of the second section II is shown by way of example in the sequence of FIGS. 6 and 7.

The first section I and the second section II of the frame 3 can be designed to support the sonotrode 101 in the opening 4. The first section I of the frame 3 can have one, two or more projections 5a, 5b towards the opening 4 for supporting the sonotrode 101 in the opening 4. The force F can act on the projections 5a, 5b arranged on the first section I of the frame 3, as shown in FIG. 7.

Figure 7:
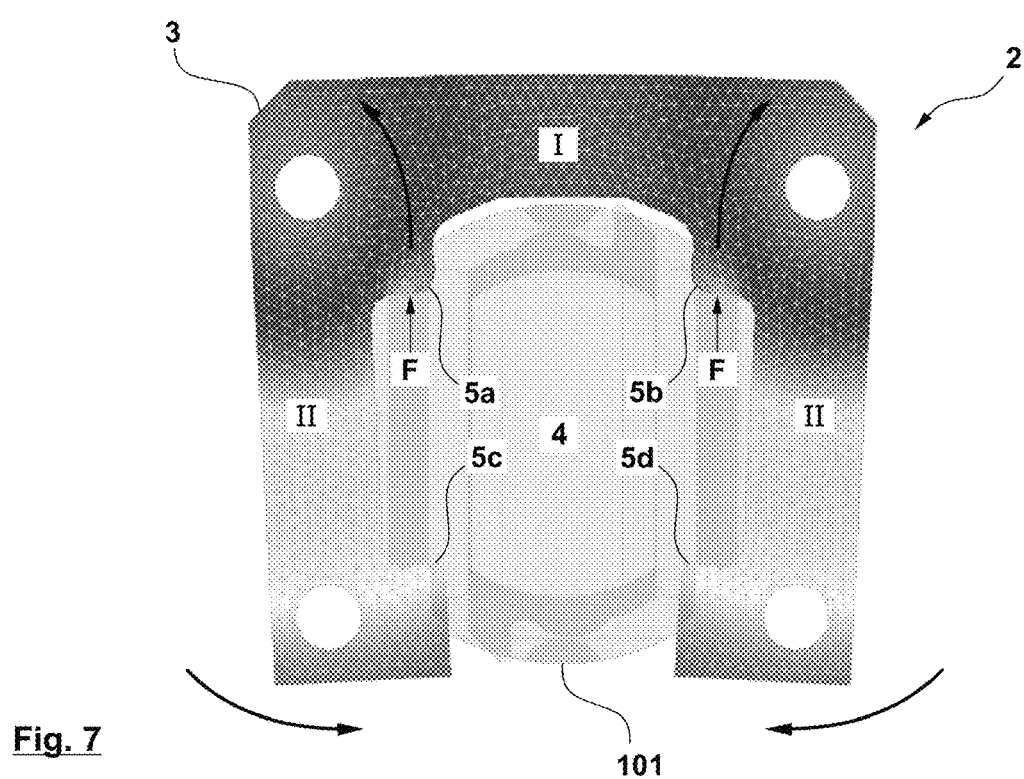
FIG. 7 shows a closer view of the bearing according to the invention in the active state.

The second section II of the frame 3 can have one, two or more projections 5c, 5d towards the opening 4 for supporting the sonotrode 101 in the opening 4, wherein the projections 5c, 5d of the second section II are moved into the opening 4 by the deformation of the frame 3, as shown in FIG. 7.

Each of the projections 5a, 5b, 5c, 5d, or the projections 5a, 5b, 5c, 5d in total, of the first and/or second section II can be designed to limit a movement of the sonotrode 101 in vertical direction and/or horizontal direction and/or to limit a rotation of the sonotrode 101 about its longitudinal axis in clockwise direction and/or counterclockwise direction.

A part of the projections 5a, 5b, 5c, 5d of the first and/or second section I, II can be shaped such that each projection 5a, 5b, 5c, 5d of the part of the projections is designed to support the sonotrode 101 by means of one, two or more line contacts with the sonotrode 101 for limiting the movement of the sonotrode 101 in vertical and/or horizontal direction. Each of the line contacts described herein can extend parallel or substantially parallel to the longitudinal axis of the sonotrode.

Figure 5:
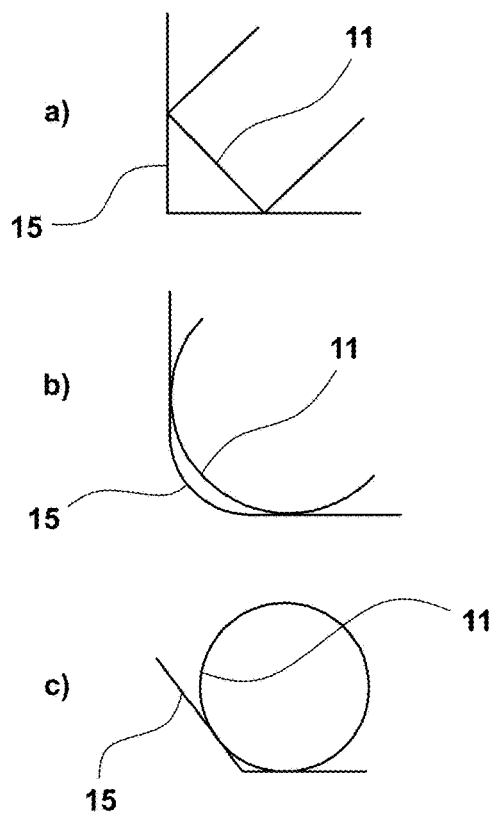
FIG. 5 shows possible variants of the projections of the frame of the bearing according to the invention.

One or more or each of the projections 5a, 5b, 5c, 5d of the first and/or second section I, II can have a bearing surface 11, as shown in FIGS. 2 and 5, for supporting the sonotrode 101 in the opening 4, wherein a point or line contact of the projection 5a, 5b, 5c, 5d with the sonotrode 101 is at the interface between the bearing surface 11 and the surface of the sonotrode 101. Each of the projections 5a, 5b of the first section I can be shaped such that the projection 5a, 5b is designed to support the sonotrode 101 by means of at least one or two point or line contacts with the sonotrode 101. Exemplary shapes for the projections 5a, 5b, 5c, 5d are shown here with reference to FIGS. 2, 4, 5, 6 and 7. FIG. 5 shows possible variants of the shapes of the projections 5a, 5b, 5c, 5d shown in FIGS. 2, 4, 6 and 7 with reference to the projection 5b. As shown in FIG. 5 b) and c), the bearing surface 11 of the projection can be in the shape of a section of a spherical surface, which allows more force to be absorbed, fewer deformations to occur and a low precision to be required in the relative arrangement of the counter surface 15 with respect to the bearing surface 11 than in comparison with variant 5 a). As shown in FIG. 5 a), the bearing surface 11 can alternatively have the shape of a section of a cuboid surface. FIG. 5 also shows differently shaped counter surfaces 15 of the sonotrode 101 with respect to the bearing surface 11, wherein the different counter surfaces 15 can be angular (FIG. 5 a), c)) or rounded (FIG. 5 b)) and can enclose an angle of (substantially) 90° (FIG. 5 a), b)) or more ((FIG. 5 c), an angle between 90° and) 180° or less (e.g. acute angle), specifically such that the projections 5a, 5b, 5c, 5d are situated with the bearing surface 11 thereof in the region of the angle. This counter surface 15 of the sonotrode is a surface of the recess 9 a of the sonotrode 101.

Each of the recesses 9a for receiving the one, two or more projections 5a, 5b, 5c, 5d can be shaped such that the recess 9a is adapted to form with one of the projections 5a, 5b, 5c, 5d the one or more line contacts extending parallel or substantially parallel to the longitudinal axis of the sonotrode 101.

Each recess of a part of the recesses 9a for receiving the one, two or more projections 5a, 5b, 5c, 5d can be shaped in cross-section perpendicular to the longitudinal axis of the sonotrode 101 such that the cross-section of the recess has a first rectilinear boundary and a second rectilinear boundary (FIG. 5), wherein the second boundary is connected to the first boundary by a corner or a rounding. Preferably, the two boundaries can enclose an angle different from 0° and 180° (e.g. substantially 90° or 120°, FIG. 5). The first boundary can extend perpendicular to the longitudinal axis of the sonotrode in vertical direction and the second boundary can extend perpendicular to the longitudinal axis of the sonotrode in horizontal direction.

The at least one or two point or line contacts of the projections 5a, 5b according to FIGS. 2, 4, 5, 6 and 7 can limit rotations of the sonotrode 101 about its longitudinal axis in clockwise direction and/or counterclockwise direction and one of the at least two line contacts limits the movement of the sonotrode 101 in vertical direction and the other of the at least two line contacts limits the movement of the sonotrode 101 in horizontal direction.

The first section I of the frame 3 can comprise a crossbar of the frame 3 and the second section II of the frame 3 can comprise two legs of the frame 3. Each of the legs II can be pivoted into the opening 4 by the action of the force F from the sonotrode 101 on the crossbar I and by means of the resulting deformation of the frame 3, as shown in FIGS. 6 and 7.

Figure 6:
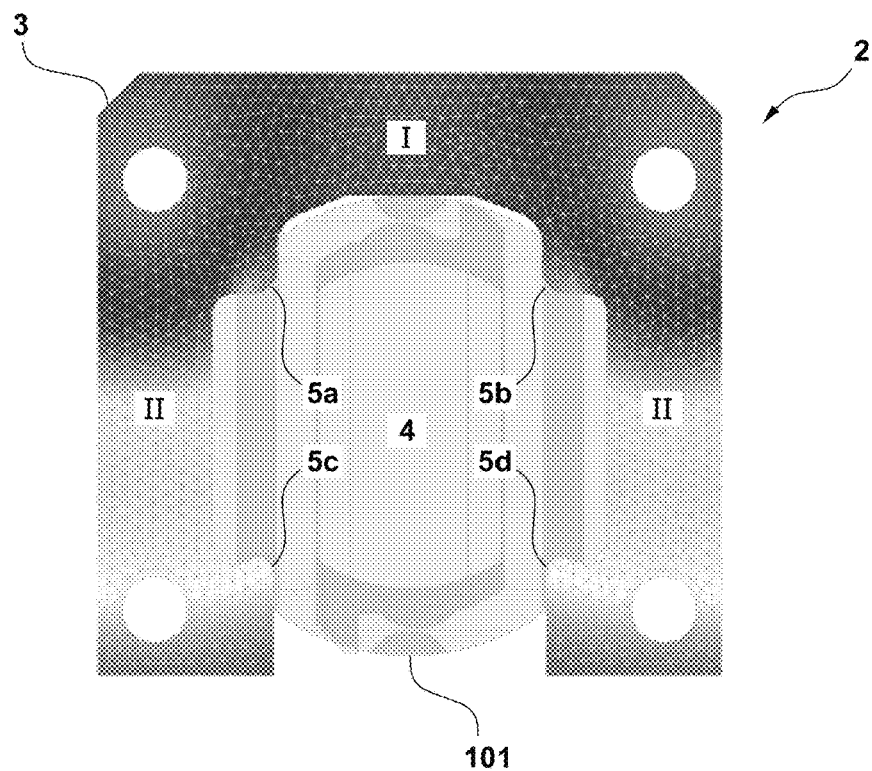
FIG. 6 shows a closer front view of the bearing according to the invention in the rest state

FIG. 6 shows a closer front view of the bearing according to the invention in the rest state, i.e. in a state in which the sonotrode does not act a force on the first section of the frame. FIG. 7 shows a closer view of the bearing according to the invention in the active state, i.e. in a state in which the sonotrode acts a force F on the first section of the frame on account of the load during the ultrasonic welding process (see arrow), the frame is thereby deformed (see arrow) and the second section II, for example the legs, is moved into the opening 4 (see arrows).

Figure 8:
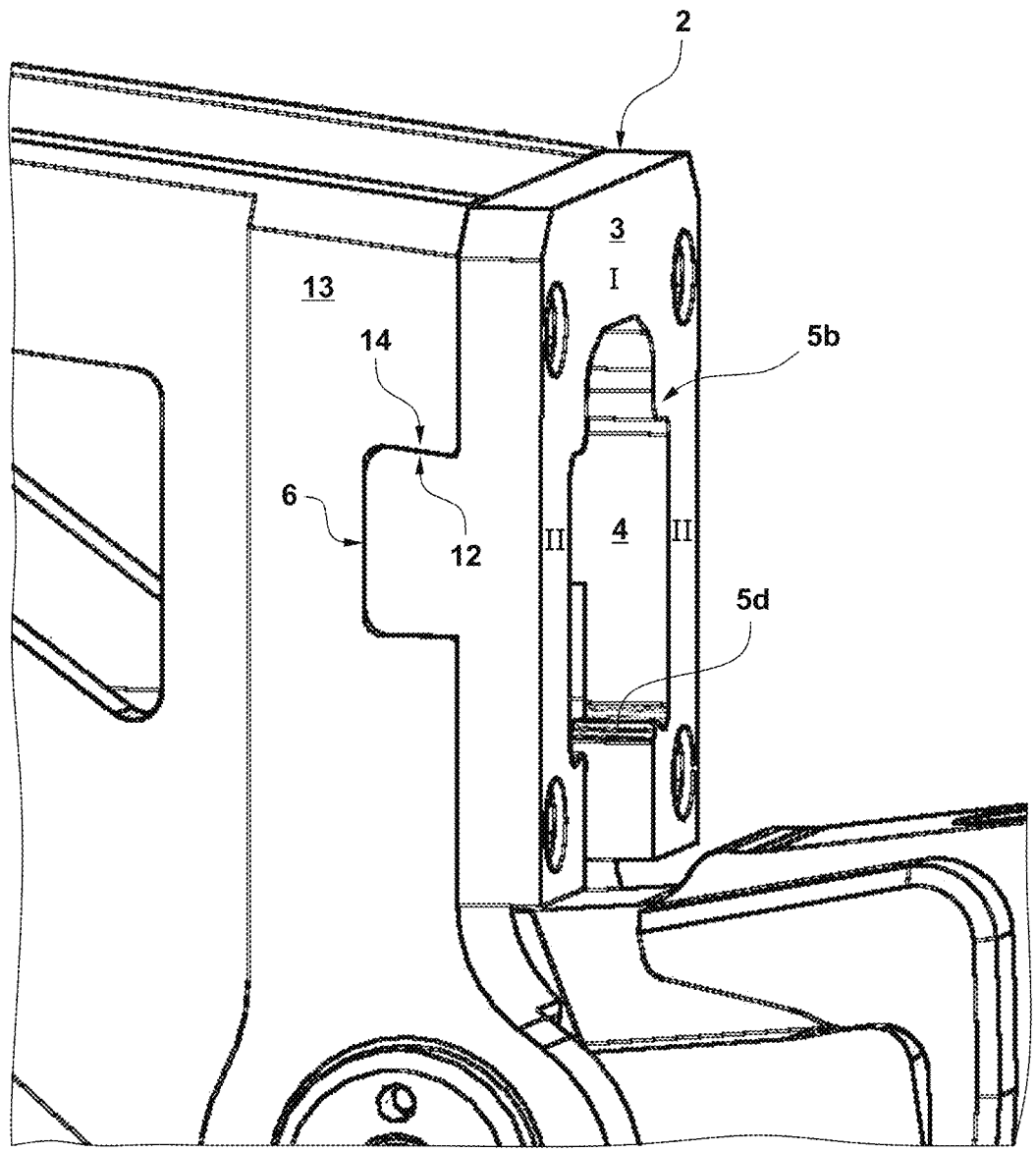
FIG. 8 shows the bearing according to the invention which is fastened by means of a support surface to a housing of an ultrasonic welding device. The four holes shown here in the frame for screws are optional.
Figure 9:
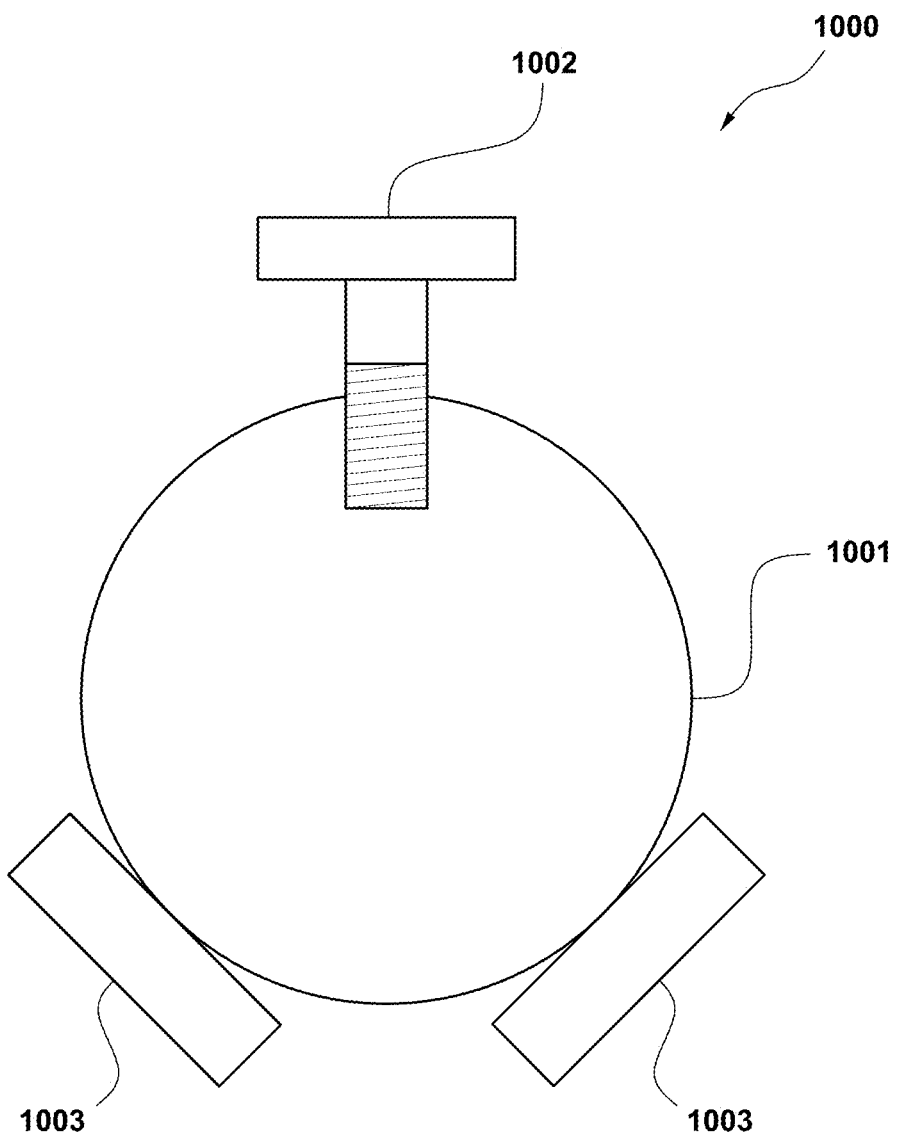
FIG. 9 shows a conventional arrangement for fixing the sonotrode according to the state of the art.

As shown in FIGS. 2, 4, 6, 7 and 8, the frame can be open in a region opposite the first section I and in the region of the first and the second section I, II in each case be closed. In the state mounted on the ultrasonic welding device 100, the frame can preferably have the shape of an inverted U, as shown in FIG. 8, wherein the crossbar I is arranged horizontally at the closed end of the U and each of the legs II of the frame 3 is arranged in each case at a different one of the vertical regions of the U. In the rest state of the frame 3, as shown in FIG. 6, the first section I of the frame 3 can extend perpendicular to the second section II of the frame 3 and/or each of the legs II can extend perpendicular to the crossbar I. In the activated state of the frame, as shown in FIG. 7, that is to say when a force F from the sonotrode acts on the first section I of the frame 3 and the frame 3 deforms, as a result of the movement of the second section II into the opening, the angle between the first section I and the second section II, in particular between one or each of the legs II and the crossbar I, is reduced to an angle of less than 90° and greater than 0°, preferably to an angle in the range 87°–89°, or to an angle of 88°. One or each of the legs II is therefore pivoted by 1-3°, preferably by 2°, into the opening 4 and in the direction of the crossbar I. In particular as a result, the sonotrode is fixed to the sonotrode particularly effectively even in the case of a load and without the use of screws.

As indicated in FIG. 2 and shown in more detail in FIG. 8, the frame 3 can further have a support surface 6 for attaching the bearing 2 to a housing (13) of the ultrasonic welding device 100, wherein the support surface 6 has an inclined plane 12 designed to slide along an inclined plane (14) of the housing (13) by the action of the force F from the sonotrode 101 on the first section I of the frame 3 in the direction of the longitudinal axis of the sonotrode 101 away from the head 103 of the sonotrode 101. As a result, in the case of a load on the sonotrode, the frame and thus the bearing for the sonotrode on the housing (13) of the ultrasonic welding device can be held even more firmly than if this load were not applied.

When the support surface 6 with inclined plane 12 is used, the bearing 2 according to the invention does not require any additional fastening means, in particular any screws, in order to be fastened to the housing 13 of the ultrasonic welding device 100. If additional fastening means are to be used for safety, one or more fastening means in the first section I of the frame 3 are sufficient. If it is desired to use further fastening means, for example in the second section II of the frame 3, it is possible here to use fastening means with play, for example small screws, in such a way that the movement of the second section II into the opening 4 in reaction to a deformation of the frame 3 on account of the force F acting from the sonotrode 101 on the first section I is not or not substantially affected for the fixing of the sonotrode 101 and the realization of the advantages described here. In each of the bearings 2 according to the invention described here, the four holes in the frame 3 for screws are optional.

According to the invention, a method for retrofitting the sonotrode 101 of the ultrasonic welding device 100 is likewise described, the method comprising: removing one or more fastening means 1002, in particular screws, from the sonotrode 101, wherein the fastening means 1002 are designed to limit a movement of the sonotrode 101 in vertical direction and/or horizontal direction and/or to limit a rotation of the sonotrode 101 about its longitudinal axis in clockwise direction and/or counterclockwise direction; attaching any of the bearing 2 according to the invention described here or kit 8 according to the invention to a housing of the ultrasonic welding device 100 such that the sonotrode 101 is passed through the opening 4 of the bearing 2 and is supported by the frame 3 of the bearing 2, for example by engagement of the projections 5a to 5d in the recess 9a, wherein preferably the limiting means 7 is attached to the sonotrode 101, for example by means of attachment in the recess 9b.

As described, the bearing 2 according to the invention or the kit 8 according to the invention can be used for the very advantageous supporting of the sonotrode 101 of the ultrasonic welding device 100 and two such that the disadvantages associated above with the prior art are overcome.

In the description and in the figures, preferred embodiments of the invention claimed by the following claims are described. The optional features disclosed in the above description, the claims and the drawings can be used both individually and in any combination for the implementation of the invention claimed here according to the accompanying claims in its various configurations.

The invention claimed is:

1. A bearing for a sonotrode of an ultrasonic welding device, the bearing comprising:
   a frame, wherein the frame at least partially delimits an opening for receiving the sonotrode,
   wherein the frame is designed in a region of the opening to support the sonotrode in the opening,
   wherein the frame has a first section and a second section,
   wherein the first section of the frame comprises a crossbar of the frame and the second section of the frame comprises at least one leg of the frame,
   wherein the at least one leg is attached to a portion of the crossbar,
   wherein the frame is designed in such a way that, by an action of a force from the sonotrode on the crossbar, the frame deforms in such a way that the at least one leg is thereby moved into the opening in order to exert a clamping force on the sonotrode,
   wherein the crossbar has one, two or more projections towards the opening for supporting the sonotrode in the opening, wherein the force acting from the sonotrode on the crossbar acts on the one, two or more projections, and wherein each projection of at least a part of the one, two or more projections is shaped such that that projection is designed to support the sonotrode by means of at least one line contact with the sonotrode.

2. The bearing according to claim 1, wherein the at least one leg comprises two legs each attached to a different end of the crossbar.

3. The bearing according to claim 2, wherein each of the two legs is pivoted into the opening by the action of the force from the sonotrode on the crossbar and by means of a resulting deformation of the frame in order to exert the clamping force on the sonotrode.

4. The bearing according to claim 1, wherein each of the at least one line contact extends parallel or substantially parallel to a longitudinal axis of the sonotrode.

5. The bearing according to claim 1, wherein the at least one line contact comprises at least two line contacts.

6. The bearing according to claim 5, wherein the at least two line contacts limit rotations of the sonotrode about its longitudinal axis.

7. The bearing according to claim 5, wherein one of the at least two line contacts limits movement of the sonotrode in a vertical direction and the other of the at least two line contacts limits movement of the sonotrode in a horizontal direction.

8. The bearing according to claim 1, wherein the at least one leg is attached to an end of the crossbar.

9. An ultrasonic welding device, comprising:
   a bearing, the bearing comprising:
      a frame, wherein the frame at least partially delimits an opening for receiving a sonotrode,
      wherein the frame is designed in a region of the opening to support the sonotrode in the opening,
      wherein the frame has a first section and a second section, wherein the first section of the frame comprises a crossbar of the frame and the second section of the frame comprises at least one leg of the frame, wherein the at least one leg is attached to a portion of the crossbar, wherein the frame is designed in such a way that, by an action of a force from the sonotrode on the crossbar, the frame deforms in such a way that the at least one leg is thereby moved into the opening in order to exert a clamping force on the sonotrode, wherein the crossbar has one, two or more projections towards the opening for supporting the sonotrode in the opening, wherein the force acting from the sonotrode on the crossbar acts on the one, two or more projections, and wherein each projection of at least a part of the one, two or more projections is shaped such that that projection is designed to support the sonotrode by means of at least one line contact with the sonotrode;

a sonotrode;

an anvil carrier; and an anvil arranged on the anvil carrier;

wherein the sonotrode extends through the opening of the bearing and is supported by the frame.

10. The ultrasonic welding device according to claim 9, wherein the at least one leg is attached to an end of the crossbar.

\* \* \* \* \*